United States Patent Office 3,564,404
Patented Feb. 16, 1971

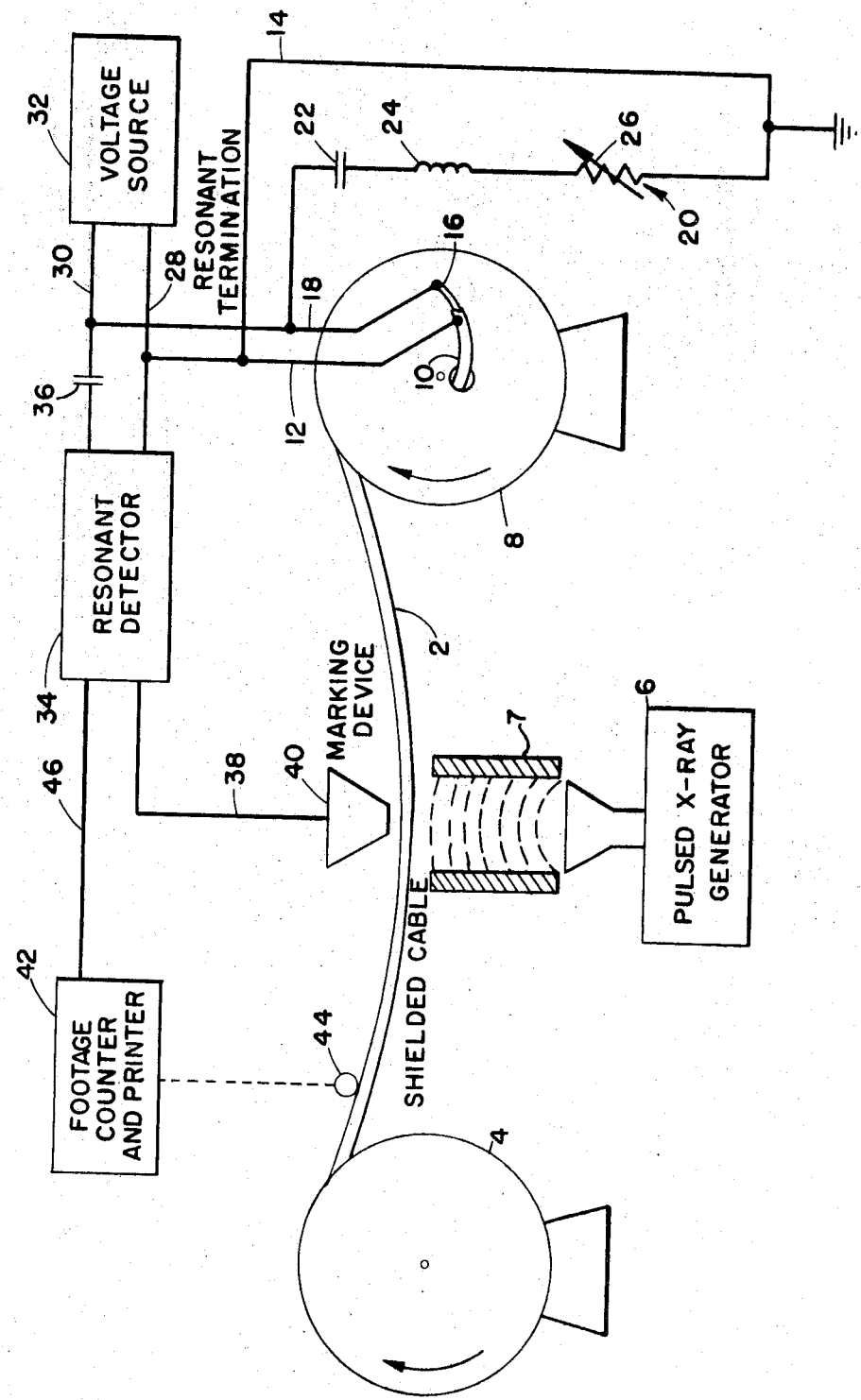

3,564,404
METHOD AND APPARATUS INCLUDING RESONANT TERMINATION FOR DETECTING INSULATION DIELECTRIC DISCONTINUITIES IN ELECTRIC CABLE
David Eigen, Passaic, N.J., assignor to The Okonite Company, Passaic, N.J., a corporation of Delaware
Filed Oct. 27, 1966, Ser. No. 589,891
Int. Cl. G01r 31/12
U.S. Cl. 324—54           10 Claims

ABSTRACT OF THE DISCLOSURE

A method and apparatus for detecting discontinuities in the insulation of an electric cable wherein a stressing voltage is applied to the cable to cause ionization of dielectric discontinuities within the cable. The ionization is discharged to produce a signal having a radio-frequency component and the radio-frequency component detected by means of a resonant detector. Resonant termination means are provided for terminating the cable with respect to the radio-frequency component in the characteristic impedance of the cable thus presenting a low impedance to the radio frequency component signal and a high impedance to other signals. This provides a detected radio-frequency component substantially free of interference from reflected signals.

This invention relates to inspection of electric cable and is particularly directed to a method and apparatus for detecting dielectric discontinuities contained in the insulation of a shielded electric cable.

In my copending application Ser. No. 573,904, filed Aug. 22, 1966, "Cable Scanning Method and Apparatus Utilizing Short Bursts of Highly Penetrating Radiation," a cable scanning technique is disclosed wherein a cable to be inspected is subjected to a moderate voltage stress and is periodically irradiated with bursts of highly penetrating radiation emitted by a pulsed radiation source, while corona discharge occurring in the cable is detected. While this technique is highly satisfactory, it has been found that the performance of this and other prior-art cable scanning techniques can be significantly improved. One problem which has plagued prior art corona detection techniques has been the cancellation of signals indicating corona by reflections from the far end of a length of cable. When a cable is not terminated in its characteristic impedance (approximately 25 ohms in typical power cable), energy is reflected. When this reflected energy is out of phase with the direct energy emanating from the corona-producing element, a cancellation takes place. This cancellation is a function of wave length, position of the corona-producing element, and total length of cable. Since it is impractical, for power reasons, to terminate a cable at high voltage with a resistance as low as 25 ohms, a termination has been designed which can be made to be 25 ohms at the detecting frequency, e.g. 0.5 mHz., but a very high impedance at the 60 Hz. power frequency. This will prevent the above-mentioned reflections at the detecting frequency, but consume minimum power at 60 Hz.

The advantages of the present invention are preferably attained by employing a resonant detector which is coupled to receive corona signals from the cable by means of a resonant cable termination tuned to the frequency of the detector to prevent reflections.

Accordingly, it is an object of the present invention to provide improved methods and apparatus for inspecting electric cable.

A further object of the present invention is to provide improved methods and apparatus for detecting corona discharge in a cable under inspection.

These and other objects and features of the present invention will be apparent from the following detailed specification and claims taken with reference to the accompanying drawing, wherein the single figure is a diagrammatic representation of a cable-scanning device embodying the present invention.

The drawing shows a cable 2 to be inspected which is being drawn from a pay-out reel 4 and past a pulsed source 6 of highly penetrating radiation, such as X-rays or gamma rays, to take-up reel 8. It should be understood that the radiation source 6 could, if desired, be moved along the cable 2, instead of moving the cable 2 past the source 6. Moreover, as shown, radiation source 6 is provided with suitable shielding means 7 to restrict the irradiation to a limited portion of the cable 2. Hence, the reels 4 and 8 are merely representative of means for causing relative movement between the cable 2 and radiation source 6. Aside from this, the reels 4 and 8 form no part of the present invention. An electrode external to the cable 2, such as electrically conductive cable sheath 10, is connected to ground potential by leads 12 and 14. In addition, a conductor 16 internal of the cable 2 is selectively coupled to ground potential by means of lead 18 and a resonant termination, indicated generally at 20, comprising a capacitance 22, an inductance 24, and an impedance matching resistance 26. The leads 12 and 18 also connect the sheath 10 and conductor 16 of cable 2 to the appropriate output leads 28 and 30 of a suitable stressing-voltage source 32. The voltage source 32 may be either a direct or alternating voltage source and applies potential between the sheath 10 and conductor 16 of cable 2 at a magnitude which is sufficient to cause some ionization of within dielectric discontinuities contained in the cable 2 but which is below the corona-inception level. A suitable radio-frequency detector 34, resonant at a frequency characteristic of corona discharge, is energized by voltage source 32 through leads 28 and 30 and receives corona-discharge signals from the cable 2 by means of leads 12, 28, 18 and 30. A corona discharge is characterized by currents of frequencies from zero up to about 50 mHz.; thus, each corona discharge includes a component of radio-frequency current, and the radio-frequency detector 34 is tuned to a radio-frequency component of current within the range of frequencies characteristic of the corona discharge. The values of capacitance 22 and inductance 24 must be such as to cause the resonant termination 20 to be resonant at the same frequency as detector 34, thereby contributing an impedance which is less than the characteristic impedance of the cable for current of a narrow band of frequencies adjacent the frequency of resonance of the termination, while providing a very high impedance to current of all other frequencies. Resistance 26 should have a value such that the characteristic impedance of resonant termination 20 will just equal the impedance of the cable 2, so that the cable 2 will be neither capacitive nor inductive. It will, of course, be understood that some or all of the impedance represented by resistance 26 may be inherent in the other components of the resonant termination 20 such as capacitance 22 and inductance 24. A capacitor 36, of suitable magnitude, is connected between lead 30 and detector 34 and serves to block passage of direct- or alternating-voltage signals from source 32 to detector 34 while passing radio-frequency corona signals from the cable 2 to detector 34. Upon detection of a radio-frequency signal exceeding a predetermined magnitude, detector 34 sends an electrical signal through lead 38 to a suitable marking device 40 to paint or otherwise mark the portion of the cable 2 in which the excessive corona discharge occurred. In addition, a footage counter and printer 42 may be driven by the cable 2, through suitable means 44, to indicate the length of the cable 2 which has been drawn past the radiation source 6. Finally, detector 34 is connected by lead 46 to supply an electrical signal to the footage counter 42, upon detection of an excessive corona signal, to cause footage counter 42 to indicate the position in the cable 2 wherein the execessive corona discharge occurred.

In use, the voltage source 32 applies a stressing voltage between the sheath 10 and conductor 16 of cable 2 to cause ionization with dielectric discontinuties within the cable 2. As indicated above, a stressing voltage is not large enough to cause discharge of such ionization. The pulsed source 6 is located adjacent the cable 2 and is positioned to irradiate the cable 2 with periodic bursts of highly penetrating radiation. The penetrating radiation is also strongly ionizing. Hence, if a dielectric discontinuity is contained in a portion of the cable 2 which is exposed to such radiation, strong ionization from both sources will be developed in the discontinuity and will effect a discharge, thus producing a radio-frequency corona signal. By moving the cable 2 past the radiation source 6, or by moving the radiation source 6 along the cable 2, successive portions of the cable 2 may be irradiated until the entire length of the cable 2 has been scanned. Since the characteristic impedance of a cable is quite low, it has, heretofore, been considered impractical to terminate a cable at high voltage. On the other hand, as noted above, failure to do so results in reflected energy which often causes cancellation of corona signals. Hence, the cable-testing devices of the prior art have not been entirely accurate. However, with the apparatus of the present invention, the detector 34 may be tuned to be resonant at a detection frequency suitable for detecting a radio-frequency component of the corona signals and resonant termination 20 may be turned to the same frequency as detector 34. When this is done, termination 20 will present a very high impedance to all signals from cable 2 except the tuned radio-frequency component of the corona signals and will present a very low impedance to the radio-frequency component. As a result, the radio-frequency component is terminated in the resistor 26, which is set at a value equal to the characteristic impedance of the cable, and reflections of the radio-frequency component of current are substantially reduced or eliminated and no longer interact with subsequent corona-discharge signals to cause erroneous readings. As a result, the reflected signals are effectively blocked by termination 20, while the corona signals are passed to detector 34. Hence, the accuracy of the device of the present invention is greatly improved.

It will be apparent to those skilled in the art that the method and apparatus of the present invention are fully useful for full-reel testing. Moreover, numerous other variations and modifications than those indicated may be made without departing from the present invention. Accordingly, it should be clearly understood that the form of the invention described above and shown in the figure of the accompanying drawing is illustrative only and is not intended to limit the scope of the invention.

What is claimed is:

1. The method of inspecting electric cable comprising the steps of:

applying a stressing voltage between a conductor internal to a cable to be inspected and an electrode external to said cable at a magnitude sufficient to cause ionization of dielectric discontinuities within said cable;

causing said ionization to discharge;

detecting radio-frequency signals from said cable at a detection frequency characteristic of said discharge by supplying said signals to a detector;

removing signals of said detection frequency from at least one end of said cable and conducting said signals to ground; and blocking passage of electrical signals from said at least one end of said cable at frequencies other than said detection frequency.

2. Apparatus for inspecting electric cable, said apparatus comprising:

a voltage source applying a stressing voltage between a conductor internal to a cable to be inspected and an electrode external to said cable at a magnitude sufficient to cause ionization of dielectric discontinuities within said cable;

means for discharging said ionization;

resonant detecting means for detecting radio-frequency signals from said cable at a detection frequency characteristic of said discharge; and means terminating said cable at an end thereof and tuned to said detection frequency for removing signals of said detection frequency from at least one end of said cable and conducting said signals to ground and for blocking passage of electrical signals from said at least one end of said cable to ground at frequencies other than said detection frequency.

3. The apparatus of claim 2 further comprising:

mens connecting said external electrode to ground; and means connecting said termination means between said conductor and ground.

4. The apparatus of claim 2 wherein said termination means comprises:

a capacitance;

an inductance;

a resistance matching the characteristic impedance of said cable; and means connecting said capacitance, and inductance, and said resistance in series between said conductor and ground.

5. The method of claim 1 wherein the step of causing said ionization to discharge comprises:

causing relative movement between said cable and a source of radiation to successively expose adjacent portions of said cable to radiation.

6. The apparatus of claim 2 wherein the means for discharging said ionization comprises:

means causing relative movement between said cable and a radiation source to successively expose adjacent portions of said cable to radiation.

7. The method of claim 1 wherein the step of causing said ionization to discharge comprises:

periodically irradiating said cable with highly penetrating radiation to cause discharge of said ionization.

8. The apparatus of claim 2 wherein the means for discharging said ionization comprises:

means for periodically irradiating said cable with highly penetrating radiation to cause discharge of said ionization.

9. The method of inspecting a shielded electrical cable having a characteristic impedance, a conductor internal to the cable, and a dielectric insulation material to locate discontinuities in the dielectric insulation, comprising:

applying a stressing voltage between the conductor internal to the cable to be inspected and the shield at a magnitude sufficient to cause ionization of dielectric discontinuities within the cable;

causing said ionization to discharge and produce in the cable a signal current having a radio-frequency component;

terminating the cable with respect to the radio-frequency component in the characteristic impedance of the cable, such that reflections of the radio-frequency component in the cable are substantially reduced;

terminating the cable with respect to currents of other frequencies in an impedance that is very high with respect to the characteristic impedance; and detecting the radio-frequency component of the discharge current, which detected component is substantially free of interference from reflected signals.

10. Apparatus for inspecting a shielded electrical cable having a characteristic impedance, a conductor internal to the cable, and a dielectric insulation material to locate discontinuities in the dielectric insulation, comprising:

voltage source means applying a stressing voltage between the conductor internal to the cable to be inspected and the shield at a magnitude sufficient to cause ionization of dielectric discontinuities within the cable;

means for discharging said ionization to produce currents in the conductor having a radio-frequency component;

resonant detector means for detecting the radio-frequency component; and resonant termination means terminating the cable with respect to radio-frequency component in the characteristic impedance of the cable and providing a high impedance to the stressing voltage.

References Cited

UNITED STATES PATENTS

| 2,602,834 | 7/1952 | Leslie et al. | 324—52 |
| 2,887,652 | 5/1959 | Bendayan et al. | 324—52X |
| 2,937,336 | 5/1960 | Gooding | 324—54 |
| 2,948,849 | 8/1960 | Foster | 324—54 |
| 2,996,664 | 8/1961 | Vogel et al. | 324—54 |
| 3,015,774 | 1/1962 | Eigen | 324—54 |
| 3,031,643 | 4/1962 | Sheftelman | 324—52X |
| 3,156,865 | 10/1964 | Lamont | 324—52X |
| 3,364,421 | 1/1968 | Bullwinkel | 324—54 |

GERARD R. STRECKER, Primary Examiner